(12) United States Patent
Bezel et al.

(10) Patent No.: US 11,035,727 B2
(45) Date of Patent: Jun. 15, 2021

(54) SPECTROMETER FOR VACUUM ULTRAVIOLET MEASUREMENTS IN HIGH-PRESSURE ENVIRONMENT

(71) Applicant: KLA-Tencor Corporation, Milpitas, CA (US)

(72) Inventors: Ilya Bezel, Mountain View, CA (US); Anatoly Shchemelinin, Bozeman, MT (US)

(73) Assignee: KLA Corporation, Milpitas, CA (US)

( * ) Notice: Subject to any disclaimer, the term of this patent is extended or adjusted under 35 U.S.C. 154(b) by 84 days.

(21) Appl. No.: 16/296,437

(22) Filed: Mar. 8, 2019

(65) Prior Publication Data

US 2019/0285470 A1 Sep. 19, 2019

Related U.S. Application Data

(60) Provisional application No. 62/642,475, filed on Mar. 13, 2018.

(51) Int. Cl.
*G01J 3/02* (2006.01)
*G01J 3/28* (2006.01)
*G01J 3/443* (2006.01)

(52) U.S. Cl.
CPC ............ *G01J 3/024* (2013.01); *G01J 3/0208* (2013.01); *G01J 3/0237* (2013.01); *G01J 3/0248* (2013.01); *G01J 3/0286* (2013.01); *G01J 3/2823* (2013.01); *G01J 3/443* (2013.01)

(58) Field of Classification Search
CPC ........ G01J 3/0208; G01J 3/0237; G01J 3/024; G01J 3/2823; G01J 3/443; G01J 1/58; G01J 3/0205; G01J 3/0248; G01J 3/0286; G01J 3/0291; G01J 3/10
See application file for complete search history.

(56) References Cited

U.S. PATENT DOCUMENTS

| | | | | |
|---|---|---|---|---|
| 2008/0087847 | A1* | 4/2008 | Bykanov | H05G 2/008 250/504 R |
| 2009/0159801 | A1* | 6/2009 | Knapp | G02B 5/20 250/363.01 |
| 2013/0169966 | A1* | 7/2013 | Shchegrov | G01N 21/211 356/369 |
| 2015/0049778 | A1* | 2/2015 | Shchemelinin | G02B 27/1006 372/76 |
| 2016/0268120 | A1* | 9/2016 | Bezel | H01J 65/04 |
| 2018/0216998 | A1 | 8/2018 | Gross | |

\* cited by examiner

*Primary Examiner* — Violeta A Prieto
(74) *Attorney, Agent, or Firm* — Suiter Swantz pc llo

(57) ABSTRACT

A spectrometer apparatus is disclosed. The apparatus may include light source and the light source may include a chamber for sustaining a plasma within the internal volume of the chamber. The apparatus may also include a spectrometer cavity and a windowless entrance slit. The windowless entrance slit may fluidically and optically couple the spectrometer cavity and the internal volume of the chamber of the light source. Further, the apparatus may include a diffractive element disposed within the spectrometer cavity and a window positioned at an opposite end of the spectrometer cavity from the windowless slit. The apparatus may also include a camera and a spectrometer.

30 Claims, 3 Drawing Sheets

SPECTROMETER FOR VACUUM ULTRAVIOLET MEASUREMENTS IN HIGH-PRESSURE ENVIRONMENT

CROSS-REFERENCE TO RELATED APPLICATION

The present application claims the benefit under 35 U.S.C. § 119(e) of U.S. Provisional Application Ser. No. 62/642,475, filed Mar. 13, 2018, entitled SPECTROMETER FOR VUV MEASUREMENTS IN HIGH-PRESSURE ENVIRONMENT, naming Ilya Bezel and Anatoly Shchemelinin as inventors, which is incorporated herein by reference in the entirety.

TECHNICAL FIELD

The present invention generally relates to spectroscopy, and, more particularly, to an apparatus and method for vacuum ultraviolet measurements in high pressure environments.

BACKGROUND

Collecting spectral data is one of the most important parts of experimental work. Vacuum ultraviolet (VUV) spectrometers are limited with the transmission of VUV windows. VUV spectrometers are manufactured using vacuum-sealed designs with window-less detectors. VUV light sources, such as laser sustained plasma (LSP) sources, usually operate in high-pressure environments that are not compatible with VUV spectrometers. LSP high-intensity radiation tends to damage detectors, such as silicon (Si) VUV detectors. Additionally, typical VUV designs do not meet the cleanliness requirements.

Therefore, it would be desirable to provide an apparatus and method that cure the shortfalls of the previous approaches identified above.

SUMMARY

An apparatus is disclosed, in accordance with one or more embodiments of the present disclosure. In one embodiment, the apparatus includes a light source configured to generate light. In another embodiment, the light source includes a chamber for sustaining a plasma with the internal volume of the chamber. In another embodiment, the plasma emits the light in response to a pump beam. In another embodiment, the apparatus includes a spectrometer cavity. In another embodiment, the apparatus includes a windowless entrance slit. In another embodiment, the windowless entrance slit is fluidically and optically coupled to the spectrometer cavity and internal volume of the chamber of the light source. In another embodiment, the apparatus includes a diffractive element disposed within the spectrometer cavity. In another embodiment, the apparatus includes a window positioned at an opposite end of the spectrometer cavity from the windowless slit. In another embodiment, a first portion of the window is coated with one or more scintillator materials and a second portion of the window is uncoated. In another embodiment, the diffractive element and the windowless slit are positioned such that light transmitted through the windowless slit illuminates the diffractive element and the diffractive element directs the light to the window. In another embodiment, the apparatus includes a camera configured to image visible light emitted by the one or more scintillator materials of the window in response to the light from the diffractive element. In another embodiment, the apparatus includes a spectrometer configured to receive a portion of the light directed from the diffractive element and transmitted through the uncoated second portion of the window.

An apparatus is disclosed, in accordance with one or more embodiments of the present disclosure. In one embodiment, the apparatus includes a spectrometer cavity. In another embodiment, the apparatus includes a windowless entrance slit. In another embodiment, the windowless entrance slit is fluidically and optically coupled to the spectrometer cavity and internal volume of the chamber of the light source. In another embodiment, the apparatus includes a diffractive element disposed within the spectrometer cavity. In another embodiment, the apparatus includes a window positioned at an opposite end of the spectrometer cavity from the windowless slit. In another embodiment, a first portion of the window is coated with one or more scintillator materials and a second portion of the window is uncoated. In another embodiment, the diffractive element and the windowless slit are positioned such that light transmitted through the windowless slit illuminates the diffractive element and the diffractive element directs the light to the window. In another embodiment, the apparatus includes a camera configured to image visible light emitted by the one or more scintillator materials of the window in response to the light from the diffractive element. In another embodiment, the apparatus includes a spectrometer configured to receive a portion of the light directed from the diffractive element and transmitted through the uncoated second portion of the window.

A method is disclosed, in accordance with one or more embodiments of the present disclosure. In one embodiment, the method may include, but is not limited to, generating light. In another embodiment, the method may include, but is not limited to, transmitting the light through an entrance slit of a spectrometer cavity and onto a diffractive element disposed within the spectrometer cavity. In another embodiment, the method may include, but is not limited to, directing diffracted light from the diffractive element through a first coated portion of a window of the spectrometer cavity, wherein the first coated portion of the window is coated with one or more scintillator materials. In another embodiment, the method may include, but is not limited to, transmitting a zeroth-order portion of the light from the diffractive element through a second uncoated portion of the window. In another embodiment, the method may include, but is not limited to, imaging, with a camera, visible light emitted by the one or more scintillator materials of the first coated portion of the window in response to the light from the diffractive element. In another embodiment, the method may include, but is not limited to, receiving, with a spectrometer, the zeroth-order portion of the light transmitted through the second uncoated portion of the window.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Vacuum ultraviolet (VUV) spectrometers are limited with the transmission of VUV windows. VUV spectrometers are commonly manufactured using vacuum-sealed designs with window-less detectors. VUV light sources, such as laser sustained plasma (LSP) sources, usually operate in high-pressure environments that are not compatible with VUV spectrometers. LSP high-intensity radiation tends to damage detectors, such as silicon (Si) VUV detectors. Additionally, typical VUV designs do not meet the cleanliness requirements and are directed to targeting x-rays rather than VUV range.

There is a desire to adapt VUV spectrometers for sub-120 nm ranges and furthermore enable measurements for high-pressure environments (e.g., plasma chambers). When using appropriate optical components, such a spectrometer can be connected to a vacuum system and measure spectra below 120 nm. Additionally, there is a desire to reduce spectrometer degradation by high intensity VUV radiation and reduce high-pressure volume.

Figure 1A:
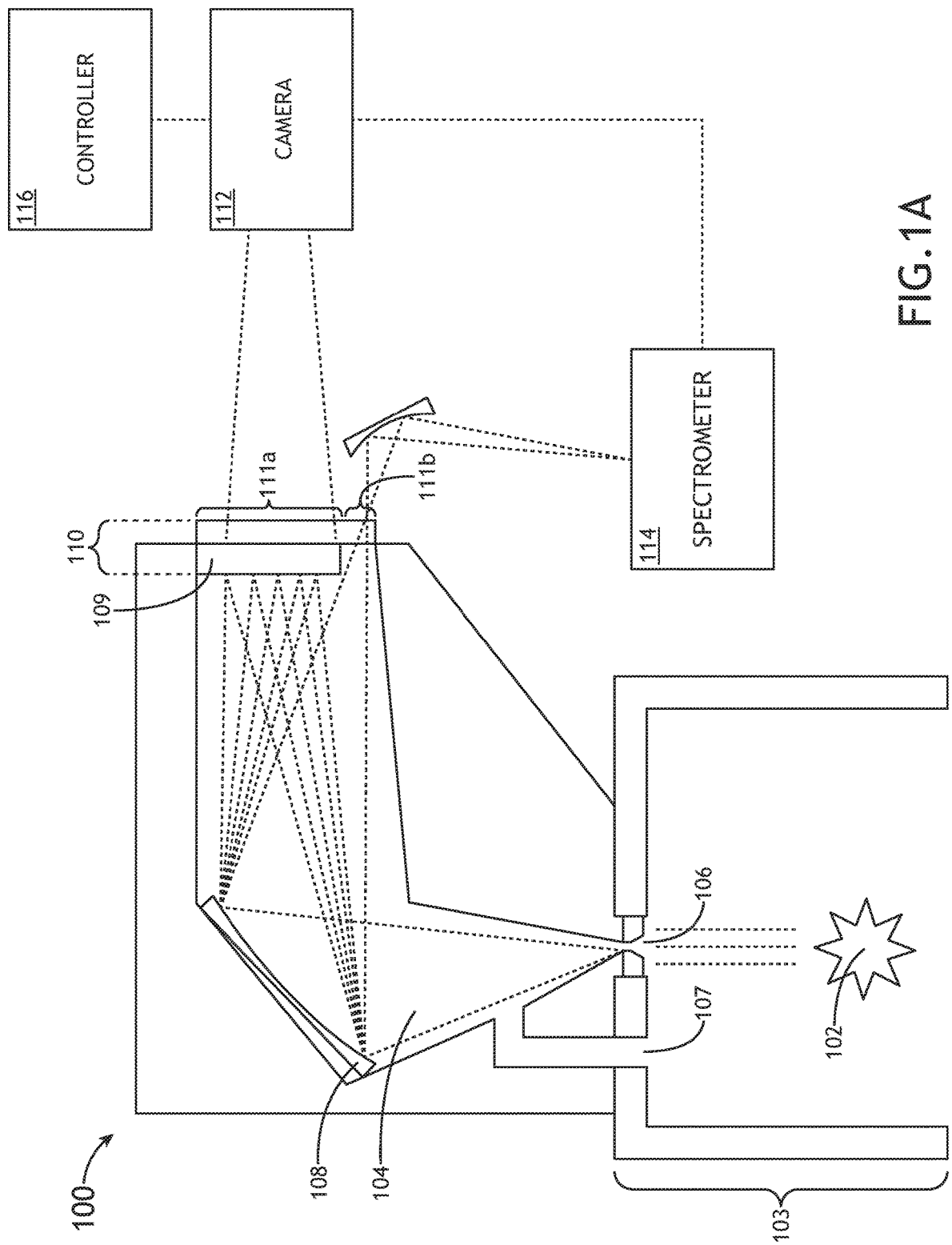
FIG. 1A illustrates a simplified schematic view of a spectrometer apparatus, in accordance with one or more embodiments of the present disclosure.
Figure 1B:
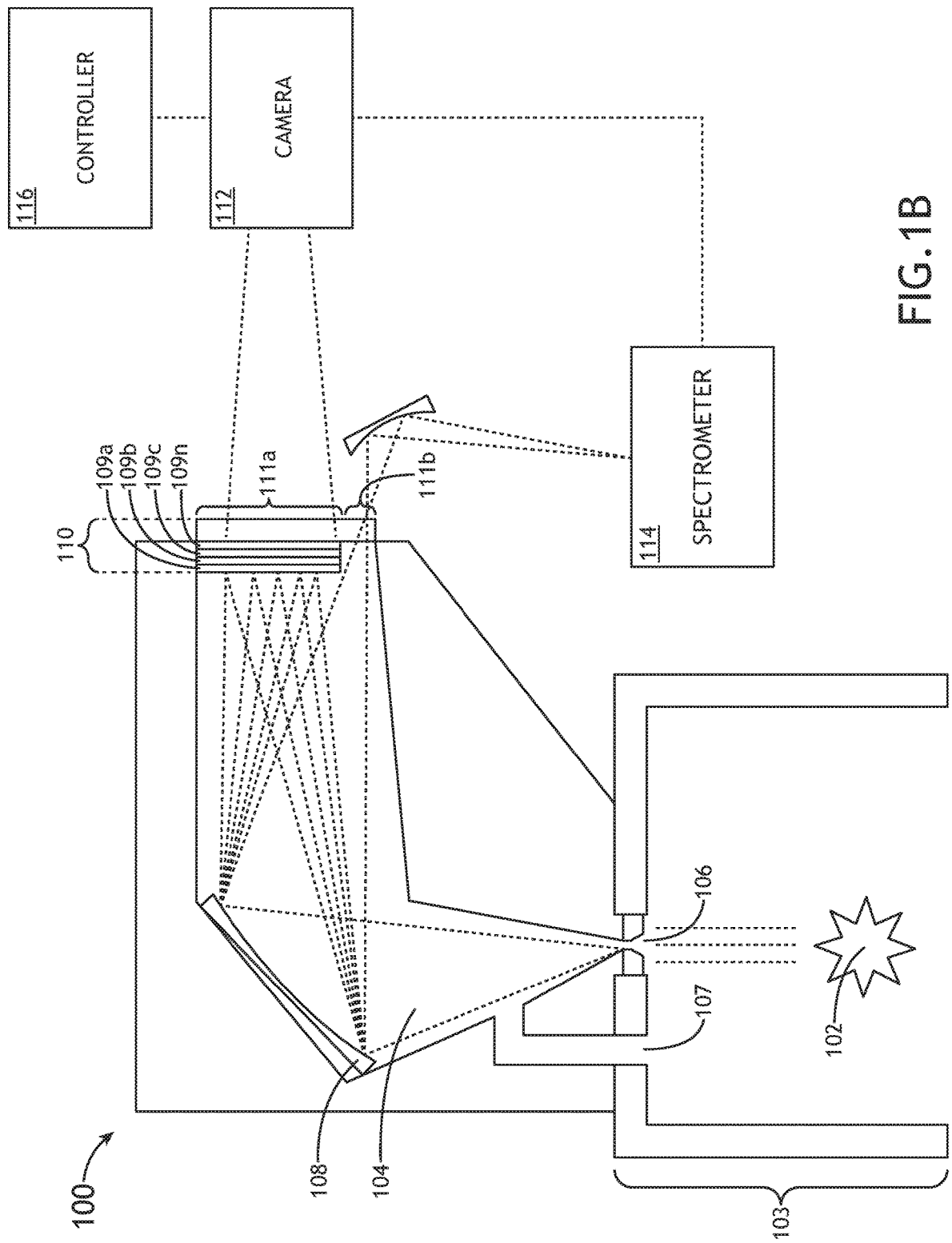
FIG. 1B illustrates a simplified schematic view of a spectrometer apparatus, in accordance with one or more embodiments of the present disclosure.
Figure 2:
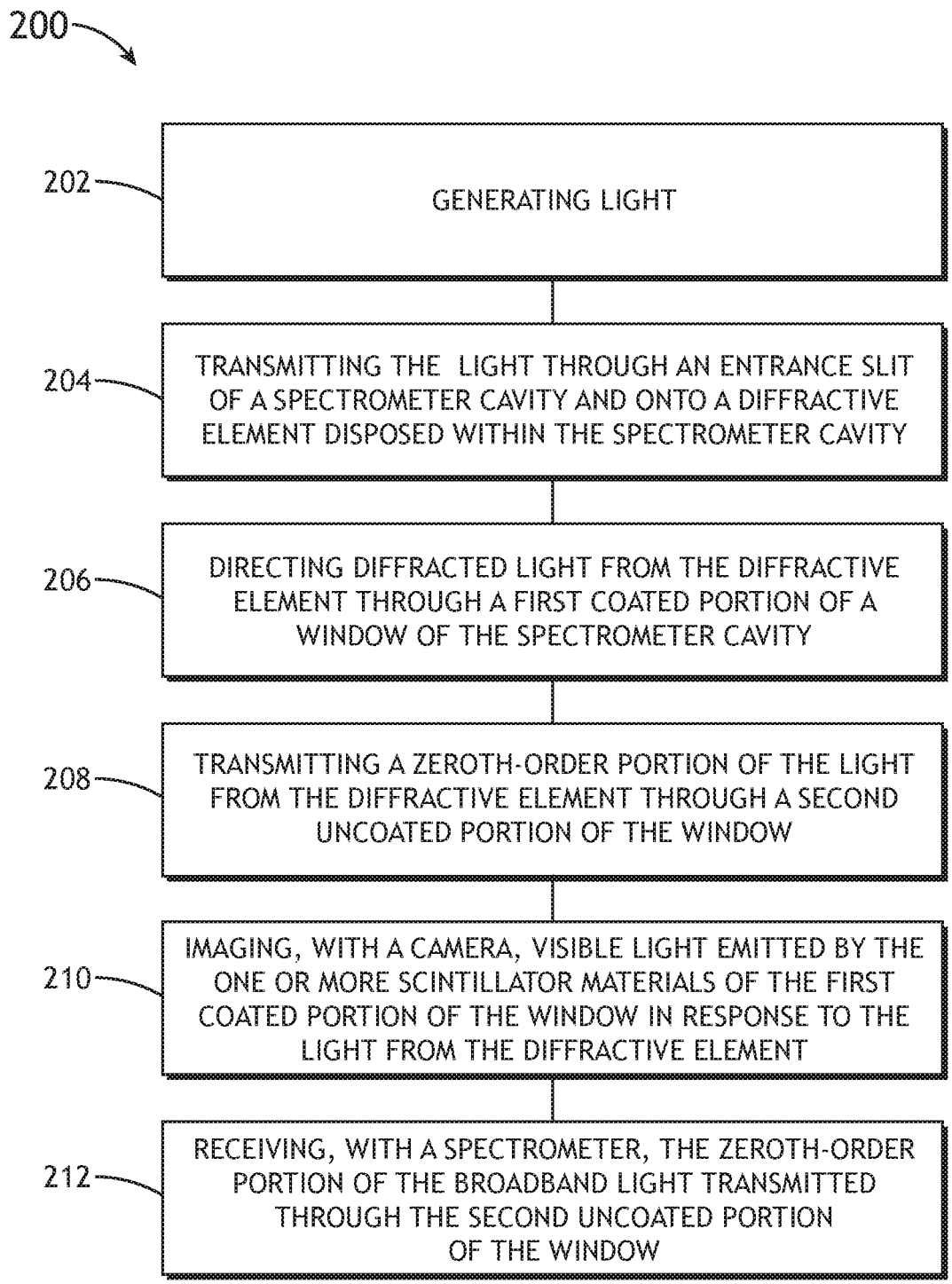
FIG. 2 illustrates a flow diagram depicting a method for implementing the spectrometer apparatus, in accordance with one or more embodiments of the present disclosure.

Referring generally to FIGS. 1A-2, an apparatus and method for spectral measurements of light sources are described, in accordance with one or more embodiments of the present disclosure.

FIGS. 1A-1B illustrate a simplified schematic view of a spectrometer apparatus 100, in accordance with one or more embodiments of the present disclosure. In one embodiment, the spectrometer apparatus 100 includes a spectrometer cavity 104, a windowless entrance slit 106, a diffractive element 108, a window 110, a camera 112, and a spectrometer 114.

In one embodiment, the spectrometer apparatus 100 includes a light source 102. The light source 102 may include any light source known in the art. For example, the light source 102 may include, but is not limited to, a broadband light source, a narrowband light source, or the like. For example, the light source 102 may include one or more laser sustained plasma (LSP) sources or one or more gas discharge sources. For instance, the light source 102 may be configured to emit at least vacuum ultraviolet (VUV) light. In one embodiment, the spectrometer apparatus 100 may be arranged such that the light source 102 is integrated into the apparatus 100. For example, the light source 102 and spectrometer apparatus 100 collectively make up one single unit. In another embodiment, the spectrometer apparatus 100 may be coupled to the light source 102 using a standard high-pressure interface.

In another embodiment, the light source 102 includes a chamber 103 for sustaining plasma within the internal volume of the chamber 103. The light source 102 may be configured to focus a pump beam, such as one or more laser beams, into a gas volume within the chamber 103 in order to excite the gas into a plasma state. In response to the pump beam, the plasma emits light. The gas contained within the chamber 103 may include, but is not limited to, argon, xenon, neon, nitrogen or mixtures thereof. A pump source (not shown) may direct the pump beam into the chamber 103. The pump beam may include radiation of any wavelength or wavelength range known in the art including, but not limited to, visible, infrared (IR) radiation, near infrared (NIR) radiation, and/or ultraviolet (UV) radiation.

In one embodiment, the windowless entrance slit 106 fluidically and optically couples the spectrometer cavity 104 and the internal volume chamber 103 of the light source 102.

In another embodiment, the spectrometer apparatus 100 includes a ventilation path 107. The ventilation path 107 may fluidically couple the spectrometer cavity 104 and the internal volume of the chamber 103 of the light source 102 to equalize the pressure in the spectrometer cavity 104 and a pressure in the chamber 103 of the light source 102. The ventilation path 107 may be configured to prevent a large pressure difference on the windowless entrance slit 106 to assist in preventing damage of the windowless entrance slit 106. It is noted herein that the ventilation path 107 shown in FIG. 1A may consist of ventilation holes configured to equalize the pressure between the plasma chamber 103 and the spectrometer cavity 104. Therefore, the above description should not be interpreted as a limitation on the scope of the present disclosure, but merely an illustration.

It is noted herein that the spectrometer apparatus 100 may be configured for any pressure known in the art, including but not limited to, vacuum pressure.

In one embodiment, the diffractive element 108 is disposed within the spectrometer cavity 104. The diffractive element 108 may include, but is not limited to, a grating. For example, the diffractive element 108 may include, but is not limited to, a coated grating. For instance, the grating of the diffractive element 108 may be coated with any material known in the art, such as, but not limited to, platinum (Pt), bare aluminum (Al), protected aluminum (Al), and the like.

In another embodiment, the diffractive element 108 and the windowless entrance slit 106 are positioned such that light transmitted through the windowless entrance slit 106 illuminates the diffractive element 108 and such light is reflected on the high-pressure window 110. The window 110 may be positioned at the second focus plane of the diffractive element 108.

In one embodiment, the window 110 may include a first portion 111a and a second portion 111b. The first portion 111a of the window 110 may be coated with one or more scintillator materials 109. The one or more scintillator materials 109 may be configured to convert incident VUV light to visible light. In this regard, the one or more scintillator materials 109 may generate visible light in response to absorbed VUV radiation. The second portion 111b of the window may be uncoated and may be configured to be a zeroth-order collector of the illumination. It is noted herein that the first portion 111a is depicted in FIG. 1A as the upper portion of the window 110 and the second portion 111b as the lower portion of the window 110; however, such illustration is provided merely as an illustration. For example, the first portion 111a (e.g., the coated portion) may be positioned below the second portion 111b (e.g., the uncoated portion). By way of another example, the first portion 111a may be positioned next to the second portion 111b, such that the first portion 111a and the second portion 111b are arranged side-by-side. By way of another example, the first portion 111a and the second portion 111b may be arranged in a concentric configuration. For instance, the first portion 111a may be a disk (or other shape) at the center of the window 110 and the second portion 111b may surround the first portion 111a (e.g., ring) or vice-versa. The above description should not be interpreted as a limitation on the scope of the present disclosure, but merely an illustration.

The first portion 111a of the window 110 may be coated with any scintillator material known in the art. For example, the one or more scintillator materials 109 may include one or more fluorescent materials.

In another embodiment, the first portion 111a of the window 110 includes a first window segment and the second portion 111b of the window 110 comprises a second segment separated from the first window segment. The first window segment may be positioned at the second focus plane of the diffractive element 108. The second window segment may be positioned off focus of the zeroth-order light from the diffractive element 108. Such a configuration reduces the damaging effect of VUV radiation on the second window segment. In another embodiment, the zeroth-light may be selected with an aperture.

In another embodiment, the external surface of the window 110 may be coated with one or more anti-reflective layers. The one or more anti-reflective layers may include any anti-reflective layer known in the art. For example, the one or more anti-reflective layers may include an anti-reflective layer suitable for visible light, such as, but not limited to, $SiO_2$, $MgF_2$, or the like.

In one embodiment, the first portion 111a of the window 110 may be positioned at the second focus plane of the diffractive element 108 and the second portion 111b may be positioned off focus of the zeroth-order light from the diffractive element 108. For example, the zeroth-order light from the diffractive element 108 may illuminate the second portion 111b (e.g., the uncoated portion of the window 110) and be collected by the spectrometer 114. A description of zeroth-order collection suitable for implementation in the various embodiments of the present disclosure are provided in U.S. patent application Ser. No. 15/485,097, entitled "Wideband Spectrograph," by Kenneth P. Gross, filed on Jan. 27, 2017, which is incorporated herein by reference in its entirety.

In one embodiment, the spectrometer 114 is configured to receive a portion of the light from the diffractive element 108 and transmit the light (e.g., the zeroth-order light) through the uncoated second portion 111b of the window 110. For example, the spectrometer 114 may be configured to acquire one or more spectra from the light between 75 nm and 2000 nm. For instance, the spectrometer 114 may be configured to acquire one or more spectra from the light from the diffractive element 108 above 150 nm. It is noted that the spectrometer 114 may include any spectrometer known in the art, such as, but not limited to, a broadband spectrometer, a narrowband spectrometer, or the like. For example, the spectrometer 114 may include, but not limited to, a UV-BB spectrometer, a VUV-BB spectrometer, or the like. In some embodiments, the spectrometer 114 may be configured as an imaging broadband spectrometer. For example, the spectrometer 114 may include an imaging UV-broadband (BB) spectrometer.

In another embodiment, the camera 112 may be configured to image visible light emitted by the one or more scintillator materials 109 in response to light from the diffractive element 108 below 150 nm. In another embodiment, the camera 112 may be configured to image visible light emitted by the one or more scintillator materials 109 in response to light from the diffractive element 108 below 120 nm. In another embodiment, the camera 112 may be configured to image visible light emitted by the one or more scintillator materials 109 in response to light from the diffractive element 108 below 100 nm.

Referring to FIG. 1B, in another embodiment, the spectrometer apparatus 100 includes up to, and including, an N number of layers of scintillator materials 109. For example, the spectrometer apparatus 100 may include a first scintillator material 109a and a second scintillator material 109b. By way of another example, the spectrometer apparatus 100 may include a first layer of scintillator material 109a, a second layer of scintillator material 109b, a third layer of scintillator material 109c, up to, and including, an Nth layer of scintillator material 109n, as shown in FIG. 1B.

It is noted herein that the window 110 may include any window known in the art that provides good sealing, withholds high pressure, withstands VUV radiation, and allows for transmission at adequately low wavelength for more efficient zeroth-order light collection. For example, the window 110 may include a window that transmits in the range of 100 nm to 4000 nm. For instance, the window may include a sapphire window, such that the sapphire window may transmit between 150 nm and 4000 nm. In another instance, the window may include an $MgF_2$ window, such that the $MgF_2$ transmits radiation between 114 nm and 9 µm. In the case of a $MgF_2$ window that transmits radiation between 114 nm and 9 µm, the zeroth-order collector may be configured to transmit light above 120 nm, thereby extending the spectral analysis range of the apparatus 100. In a further instance, the window may include a fused silica (or quartz) window, such that the fused silica (or quartz) window may transmit between 160 nm and 2000 nm.

It is further noted herein that the window 110 may include a sacrificial window such that the window 110 may be quickly replaced.

In one embodiment, the camera 112 includes a light detector and an imaging optic. The imaging optic may be configured to image an internal (e.g., fluorescing) side of window 110 through focusing or de-focusing the optic. The imaging optic may include any imaging optic known in the art. For example, the imaging optic may include an imaging optic suitable for imaging the one or more scintillator materials 109, such as, but not limited to, an objective lens, a micro-channel plate, a fiber bundle or waveguide, a lens array, a Fresnel optic, or the like. It is noted herein that the imaging optic may be completely integrated, partially integrated, or not integrated with window 110.

In some embodiments, the one or more scintillator materials 109 may include one or more micro-channel plates positioned on the back side of the scintillator 109. The one or more micro-channel plates may be configured to block any light except the light that propagates strictly outside. It is noted herein that the one or more micro-channel plates may be of any size, such that the size of the one or more micro-channel plates defines sensor resolution.

The camera may further be configured to detect fluorescence intensity on the front surface of the window 110.

In some embodiments, the spectrometer apparatus 100 may be configured for scanning. For example, the spectrometer apparatus 100 may include a diffractive element 108

(e.g., grating 108) configured to rotate around the diffractive element's center, a slit arranged in front of the window 110, and a photodiode. In this regard, the photodiode may replace the camera 112 and the photodiode may be configured to image visible light from the scintillator materials 109.

In some embodiments, the spectrometer apparatus 100 may include one or more coupling optics positioned in front of the windowless entrance slit 106. For example, the one or more coupling optics may include one or more mirrors. For instance, the one or more coupling optics may include one or more Pt mirrors. The coupling optics may be configured to couple broadband (BB) light to a steering mirror.

It is noted herein that the position of the windowless entrance slit 106, the window 110, and the diffractive element 108 shown in FIG. 1A shall not be construed as limiting the scope of the present disclosure. For example, the position of the windowless entrance slit 106, the window 110, and the diffractive element 108 may be adjustable such that their respective positions may be adjusted to adapt to the pressure change. For instance, the window 110 and/or diffractive element 108 may be arranged on a pre-loaded spring, such that their respective positions would be adjusted based on the pressure.

It is further noted herein that the high-pressure gas may change the optical path inside the spectrometer such that the position of the windowless entrance slit 106, the window 110, the diffractive element 108, the camera 112, and the spectrometer 114 may be adjusted.

In another embodiment, spectrometer apparatus 100 may include a controller 116 communicatively coupled to the camera 112 and/or the spectrometer 114.

In one embodiment, controller 116 includes one or more processors and memory. The one or more processors may be configured to execute a set of program instructions stored in the memory, wherein the set of program instructions are configured to cause the one or more processors to carry out one or more steps of the present disclosure.

It is noted herein that the one or more components of apparatus 100 may be communicatively coupled to the various other components of apparatus 100 in any manner known in the art. For example, the controller 116 may be communicatively coupled to the camera 112 and/or the spectrometer 114 via a wireline (e.g., copper wire, fiber optic cable, and the like) and/or wireless connection (e.g., RF coupling, IR coupling, data network communication (e.g., WiFi, WiMax, Bluetooth and the like)).

The one or more processors may include any one or more processing elements known in the art. In this sense, the one or more processors may include any microprocessor-type device configured to execute software algorithms and/or instructions. In one embodiment, the one or more processors may be embodied in a desktop computer, mainframe computer system, workstation, image computer, parallel processor, or other computer system (e.g., networked computer) configured to execute a program configured to operate the apparatus 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors.

The memory may include any storage medium known in the art suitable for storing program instructions executable by the associated one or more processors and the data received from the transmitting devices (e.g., beacons, scanners). For example, the memory may include a non-transitory memory medium. For instance, the memory may include, but is not limited to, a read-only memory (ROM), a random access memory (RAM), a magnetic or optical memory device (e.g., disk), a magnetic tape, a solid state drive and the like. It is further noted that memory may be housed in a common controller housing with the one or more processors. In an alternative embodiment, the memory may be located remotely with respect to the physical location of the one or more processors.

FIG. 2 illustrates a flow diagram depicting a method 200 for implementing the spectrometer apparatus 100, in accordance with one or more embodiments of the present disclosure. It is noted herein that the steps of method 200 may be implemented all or in part by apparatus 100. It is further recognized, however, that the method 200 is not limited to the apparatus 100 in that additional or alternative apparatus-level embodiments may carry out all or part of the steps of method 200.

In step 202, light is generated. For example, the light source 102 (e.g., LSP source or gas discharge source) may emit at least broadband light. By way of another example, the light source 102 may emit at least VUV broadband light.

In step 204, the light is transmitted through a windowless entrance slit 106 of a spectrometer cavity 104 and onto a diffractive element 108 disposed within the spectrometer cavity 104. For example, the windowless entrance slit 106 fluidically coupled to the spectrometer cavity 104 may be positioned such that light is transmitted to the diffractive element 108.

In step 206, diffracted light is directed from the diffractive element 108 through a first coated portion 111a of a window 110 of the spectrometer cavity 104. For example, the first coated portion 111a of the window 110 is coated with one or more scintillator materials 109. For instance, the one or more scintillator materials 109 may include one or more fluorescent materials.

In step 208, a zeroth-order portion of the light is transmitted from the diffractive element 108 through a second uncoated portion 111b of the window 110.

In step 210, a camera 112 captures an image of visible light emitted by the one or more scintillator materials 109 of the first coated portion 111a of the window 110 in response to the light from the diffractive element. For example, the camera 112 may be configured to image visible light emitted by the one or more scintillator materials 109 in response to light from the diffractive element 108 below 150 nm. By way of another example, the camera 112 may be configured to image visible light emitted by the one or more scintillator materials 109 in response to light from the diffractive element 108 below 120 nm. By way of another example, the camera 112 may be configured to image visible light emitted by the one or more scintillator materials 109 in response to light from the diffractive element 108 below 100 nm.

In step 212, the spectrometer 114 receives the zeroth-order portion of the light transmitted through the second uncoated portion of the window. For example, the spectrometer 114 may be configured to acquire one or more spectra from the light from the diffractive element above 150 nm.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A spectrometer apparatus comprising:
    a light source configured to generate light, wherein the light source includes a chamber for sustaining a plasma within an internal volume of the chamber, wherein the plasma emits the light in response to a pump beam;
    a spectrometer cavity;
    a windowless entrance slit, wherein the windowless entrance slit fluidically and optically couples the spectrometer cavity and the internal volume of the chamber of the light source;
    a diffractive element disposed within the spectrometer cavity;
    a window positioned at an opposite end of the spectrometer cavity from the windowless entrance slit, wherein a first portion of the window is coated with one or more scintillator materials and a second portion of the window is uncoated, wherein the diffractive element and the windowless entrance slit are positioned such that light transmitted through the windowless entrance slit illuminates the diffractive element and the diffractive element directs the light to the window;
    a camera, wherein the camera is configured to image visible light emitted by the one or more scintillator materials of the window in response to the light from the diffractive element; and
    a spectrometer configured to receive a portion of the light directed from the diffractive element and transmitted through the uncoated second portion of the window.

2. The spectrometer apparatus of claim 1, wherein the light source
    comprises:
        a broadband light source or a narrowband light source.

3. The spectrometer apparatus of claim 2 wherein the light source
    comprises:
        one or more laser sustained plasma (LSP) sources or one or more gas discharge sources.

4. The spectrometer apparatus of claim 3, wherein the light source is configured to emit at least vacuum ultraviolet (VUV) light.

5. The spectrometer apparatus of claim 1, further comprising:
    a ventilation path, wherein the ventilation path fluidically couples the spectrometer cavity and the internal volume of the chamber of the light source to equalize a pressure in the spectrometer cavity and a pressure in the chamber of the light source.

6. The spectrometer apparatus of claim 1, wherein the window is positioned at a second focus plane of the diffractive element.

7. The spectrometer apparatus of claim 1, wherein the diffractive element comprises a grating.

8. The spectrometer apparatus of claim 7, wherein the grating is coated with platinum, bare aluminum, or protected aluminum.

9. The spectrometer apparatus of claim 1, wherein the spectrometer is configured to receive a portion of zeroth-order light from the light directed from the diffractive element and transmitted through the uncoated second portion of the window through a separated window.

10. The spectrometer apparatus of claim 1, wherein the window comprises:
    a sapphire window.

11. The spectrometer apparatus of claim 1, wherein an external surface of the window is coated with one or more anti-reflective layers.

12. The spectrometer apparatus of claim 1, wherein the first portion of the window comprises a first window segment and the second portion of the window comprises second segment separated from the first window segment, wherein the first window segment is positioned at a second focus plane of the diffractive element, wherein the second window segment is positioned off focus of zeroth-order light from the diffractive element.

13. The spectrometer apparatus of claim 1, wherein the one or more scintillator materials of the window comprise:
    one or more fluorescent materials.

14. The spectrometer apparatus of claim 1, wherein the spectrometer is configured to acquire one or more spectra from the light from the diffractive element above 150 nm.

15. The spectrometer apparatus of claim 1, wherein the camera is configured to image visible light emitted by the one or more scintillator materials in response to light from the diffractive element below 150 nm.

16. The spectrometer apparatus of claim 15, wherein the camera is configured to image visible light emitted by the one or more scintillator materials in response to light from the diffractive element below 120 nm.

17. The spectrometer apparatus of claim 16, wherein the camera is configured to image visible light emitted by the one or more scintillator materials in response to light from the diffractive element below 100 nm.

18. The spectrometer apparatus of claim 1, wherein the spectrometer comprises:
    a broadband spectrometer or a narrowband spectrometer.

19. The spectrometer apparatus of claim 18, wherein the spectrometer comprises:
    an imaging broadband spectrometer.

20. A spectrometer apparatus comprising:
    a spectrometer cavity;
    a windowless entrance slit disposed at an entrance portion of the spectrometer cavity, wherein the windowless entrance slit is configured to fluidically and optically couple the spectrometer cavity to a chamber of a light source;
    a diffractive element disposed within the spectrometer cavity;
    a window positioned at an opposite end of the spectrometer cavity from the windowless entrance slit, wherein a first portion of the window is coated with one or more scintillator materials and a second portion of the window is uncoated, wherein the diffractive element and the windowless entrance slit are positioned such that light transmitted through the windowless entrance slit illuminates the diffractive element and the diffractive element directs the light to the window;

a camera, wherein the camera is configured to image visible light emitted by the one or more scintillator materials of the window in response to light from the diffractive element; and a spectrometer configured to receive a portion of the light directed from the diffractive element and transmitted through an uncoated second portion of the window.

21. The spectrometer apparatus of claim 20, wherein the light source comprises:

a broadband light source or a narrowband light source.

22. The spectrometer apparatus of claim 21, wherein the light source comprises:

one or more laser sustained plasma (LSP) sources or one or more gas discharge sources.

23. The spectrometer apparatus of claim 22, wherein the light source is configured to emit at least vacuum ultraviolet (VUV) light.

24. The spectrometer apparatus of claim 20, wherein the spectrometer is configured to acquire one or more spectra from the light from the diffractive element above 150 nm.

25. The spectrometer apparatus of claim 20, wherein the camera is configured to image visible light emitted by the one or more scintillator materials in response to light from the diffractive element below 150 nm.

26. The spectrometer apparatus of claim 25, wherein the camera is configured to image visible light emitted by the one or more scintillator materials in response to light from the diffractive element below 120 nm.

27. The spectrometer apparatus of claim 26, wherein the camera is configured to image visible light emitted by the one or more scintillator materials in response to light from the diffractive element below 100 nm.

28. A method comprising:

generating light;

transmitting the light through an entrance slit of a spectrometer cavity and onto a diffractive element disposed within the spectrometer cavity;

directing diffracted light from the diffractive element through a first coated portion of a window of the spectrometer cavity, wherein the first coated portion of the window is coated with one or more scintillator materials;

transmitting a zeroth-order portion of the light from the diffractive element through a second uncoated portion of the window;

imaging, with a camera, visible light emitted by the one or more scintillator materials of the first coated portion of the window in response to the light from the diffractive element; and receiving, with a spectrometer, the zeroth-order portion of the light transmitted through the second uncoated portion of the window.

29. The method of claim 28, wherein the light comprises: a broadband light or a narrowband light.

30. The method of claim 29, wherein the light comprises: at least broadband vacuum ultraviolet (VUV) light.

\* \* \* \* \*